Patented May

UNITED STATES PATENT OFFICE 2,202,124

CELLULOSE DERIVATIVE COMPOSITION

Harold James Tattersall, Ardrossan, Scotland, assignor to Imperial Chemical Industries Limited, a corporation of Great Britain No Drawing. Application July 25, 1938, Serial No. 221,239. In Great Britain August 10, 1936

14 Claims. (Cl. 106—40)

Reference is made to my application Serial No. 156,603 filed July 30, 1937, entitled Nitrocellulose compositions of reduced inflammability which claims the use of the salts described below in nitrocellulose compositions.

The present invention relates to the production of improved cellulose derivative compositions and more particularly to the production of such compositions having reduced inflammability.

This invention has as an object the preparation of cellulose derivative compositions of reduced inflammability. A further object is the production of cellulose derivative films of good transparency and reduced inflammability. A still further object is the production of cellulose derivative films of reduced inflammability which has an increased tolerance for filling ingredients. Further objects will appear hereinafter. These objects are accomplished by the following invention.

I have found that the presence of a metallic or non-metallic salt of dimethyl phosphoric acid in a cellulose derivative composition reduces the inflammability characteristics of the films, coatings, filaments or other products obtained from the cellulose composition.

The present invention consists, therefore, in cellulose derivative compositions such as, cellulose ethers or esters, for example cellulose acetate compositions, in which for the purpose of reducing the inflammability and optionally for the purpose of improving the other properties of the composition as hereinafter described, there is included a salt of dimethyl phosphoric acid.

Certain organic salts of dimethyl phosphoric acid, when incorporated with cellulose ethers and carboxylic acid esters, permit of the formation of films or other products which are substantially transparent; and these salts also possess a plasticising action resulting in the production of films of improved flexibility. As examples of such salts, there may be mentioned the dimethyl phosphates of ammonium, cadmium and cerium and also of hydrazine, phenylurea, diphenylurea, urethane, diphenyl-guanidine, triethanolamine and methyl allophanate, etc. Such salts are preferably those derived from organic bases of low molecular weight. It is generally preferred, moreover, to employ salts derived from organic bases which contain within the molecule an ester group or other active solvent group. The transparent flexible fire-resistant compositions prepared with the aid of the described salts of dimethyl phosphoric acid are particularly suitable in the production of Celluloid-like materials, for example in the manufacture of cinema or photographic film. The compositions of my invention are of importance in photographic film which has a light sensitive layer upon at least one side thereof.

Certain other salts of dimethyl phosphoric acid, when incorporated with cellulose ethers and carboxylic acid esters, form films or other products having varying degrees of translucency or opacity. Suitable proportions of these salts may be added without causing embrittlement of the films formed from the compositions in question and some of them at least also possess a plasticising action on the films. As examples of salts there may be mentioned certain non-metallic salts, e. g. the salts of urea and guanidine, and certain metallic salts, e. g. those of calcium, barium, magnesium, lead, aluminum, zinc, copper, cobalt, manganese, antimony and thallium. The films obtained from cellulose ether and carboxylic acid ester compositions containing such metallic or non-metallic salts may be rendered less opaque or even in some cases transparent by the incorporation of a plasticizer with the cellulose ether and carboxylic acid ester or other similar non-volatile material. In the manufacture of transparent or translucent films, it is preferred to avoid the inclusion of any substantial proportion of inflammable material of a plasticising nature, e. g. camphor or dibutyl phthalate, and for this reason, therefore, it is preferred to use those salts which yield directly a product of the desired degree of transparency and flexibility.

In manufacturing relatively opaque compositions, it may, however, be desirable to employ such salts of dimethyl phosphoric acid which possess a plasticising action in order to increase the tolerance of the composition for filling ingredients, pigments and the like.

I have also found that I can obtain desirable results by incorporating such salts of dimethyl phosphoric acid with cellulose ethers and esters by incorporating the salts with the cellulose derivative in a plasticised condition and evaporating off any volatile constituents.

The salts of dimethyl phosphoric acid in general confer no undersirable odour to the plastic compositions and this property presents a distinct advantage, since many of the flame-retarding ingredients which have hitherto been proposed have been organic compounds characterised by an objectionable odour or other objectionable properties which can be avoided by choosing a suitable salt of dimethyl phosphoric acid. Other proposals have involved the use of inorganic fire-retarding agents but they, on the whole, yielded disappointing results since the large amount of such material required has usually resulted in embrittlement of the plastic.

I have further found that the inflammability of compositions containing cellulose derivatives and a salt of dimethyl phosphoric acid may be further reduced by the incorporation of a relatively small proportion of a number of inorganic compounds, several of which have no injurious effect upon the clarity of the film obtained. These accessory compounds are stable colourless salts soluble in organic solvents and free from oxidising action. Among these compounds there may be mentioned ammonium hypophosphite, calcium tartrate, mercuric potassium iodide, sodium fluoride, stannic chloride, titanium sulphate, uranyl acetate and barium hypophosphite. It is particularly desirable to incorporate a small proportion of these compounds along with the simple urethane salts of dimethyl phosphoric acid since a good reduction in inflammability occurs.

The invention is further illustrated but is not intended to be limited by the following examples in which the parts given are parts by weight.

Example 1

100 parts of cellulose acetate are dissolved in acetone and incorporated with 25 parts of the urethane salt of dimethyl phosphoric acid. The solution is then made into transparent flexible films by a normal casting process. When a flame is brought into contact with such a film charring takes place in immediate contact with the flame; but ceases immediately when the flame is withdrawn, without any trace of smouldering.

Example 2

100 parts of benzyl cellulose are dissolved in a mixture of toluol (80 volumes) and industrial alcohol (20 volumes), and incorporated with from 10 to 25 parts of the urethane salt of dimethylphosphoric acid. The solution is made into a flexible film by a normal casting process, and produces a transparent or translucent material which is uninflammable and does not smoulder after being inserted in a flame and removed therefrom.

Example 3

100 parts of ethyl cellulose are incorporated with 25 parts of urethane dimethyl-phosphoric acid in the manner described in Example 1. The plasticised ethyl cellulose shows greatly reduced inflammability in comparison with the untreated material when cast into films in the usual manner.

Other cellulose derivatives which can be treated in this way are cellulose propionate, cellulose butyrate, cellulose oleate, cellulose nitroacetate, cellulose aceto-butyrate, ethyl-benzyl cellulose, methyl cellulose.

Any proportion of dimethyl phosphates will have some fire-proofing action but this is seldom of practical value until their proportion reaches 10 per cent on the weight of cellulose derivative. The upper limit to the proportion of salts varies with the salt used. When using urethane dimethyl phosphate a proportion higher than 25 per cent produces a film which is too soft. Salts which have less plasticising action than the urethane salt could be present in higher proportions.

If the dimethyl phosphates are ground, for instance, in a colloid mill, before addition to the cellulose derivative composition solution a higher degree of translucency can be obtained in the final film. The grinding process can be continued till the finest state of division is obtained and I get greater translucency the more finely the salts are ground.

This invention is a valuable advance in the art since it makes it possible to reduce the inflammability of plasticised cellulose derivative compositions without the disadvantages of objectionable odour or colour, while the retarding ingredients do not embrittle the plastic and in some cases even act as a plasticiser, and also those salts of dimethyl phosphoric acid that exert a plasticising action on the cellulose derivative also confer a high tolerance for inert fillers, even in a plastic containing a considerable proportion of cellulose derivative. Compositions made up with cellulose acetate and urethane dimethyl phosphate with the addition of plasticisers are useful as cable lacquers, in which use it is particularly important that they should be non-inflammable.

As many apparently widely different embodiments of this invention may be made without departing from the spirit and scope thereof, it is to be understood that the invention is not limited to the specific embodiments thereof except as defined in the appended claims.

I claim:

1. A cellulose derivative composition taken from the class consisting of cellulose ethers and carboxylic acid esters having incorporated therein a salt of dimethyl phosphoric acid.

2. A cellulose derivative composition taken from the class consisting of cellulose ethers and carboxylic acid esters having incorporated therein a salt of dimethyl phosphoric acid, which possess plasticising properties.

3. A cellulose derivative composition taken from the class consisting of cellulose ethers and carboxylic acid esters having incorporated therein an organic salt of dimethyl phosphoric acid.

4. A cellulose derivative composition taken from the class consisting of cellulose ethers and carboxylic acid esters having incorporated therein an organic salt of dimethyl phosphoric acid of low molecular weight.

5. A cellulose derivative composition taken from the class consisting of cellulose ethers and carboxylic acid esters having incorporated therein an organic salt of dimethyl phosphoric acid of low molecular weight and possessing plasticizing properties.

6. A cellulose derivative composition taken from the class consisting of cellulose ethers and carboxylic acid esters having incorporated therein an organic salt of dimethyl phosphoric acid of low molecular weight containing an active solvent group.

7. A cellulose derivative composition taken from the class consisting of cellulose ethers and carboxylic acid esters having incorporated therein a salt of dimethyl phosphoric acid, and a suitable colorless salt soluble in organic solvents and free from oxidizing action.

8. A cellulose acetate composition containing a salt of dimethyl phosphoric acid.

9. A benzyl cellulose composition containing a salt of dimethyl phosphoric acid.

10. An ethyl cellulose composition containing a salt of dimethyl phosphoric acid.

11. A composition as set forth in claim 1 wherein the salt is the urethane salt.

12. A composition as set forth in claim 1 wherein the salt is the calcium salt.

13. A composition as set forth in claim 1 wherein the salt is the lead salt.

14. A cellulose acetate composition containing the urethane salt of dimethyl phosphoric acid.

HAROLD J. TATTERSALL.